(12) United States Patent
Cowman et al.

(10) Patent No.: US 10,829,895 B2
(45) Date of Patent: Nov. 10, 2020

(54) USE OF AN ACRYLATE COPOLYMER AS RETENTION AID IN A METHOD OF MAKING A SUBSTRATE COMPRISING CELLULOSIC FIBRES

(71) Applicant: Archroma IP GmbH, Reinach (CH)

(72) Inventors: John Cowman, Bradford (GB); Damien Julien Corpet, Oslon (FR); Paul Dekock, Wakefield (GB); Achim Kohler, Heilbronn (DE)

(73) Assignee: Archroma IP GmbH, Reinach (CH)

( * ) Notice: Subject to any disclaimer, the term of this patent is extended or adjusted under 35 U.S.C. 154(b) by 129 days.

(21) Appl. No.: 16/069,566

(22) PCT Filed: Jan. 13, 2017

(86) PCT No.: PCT/EP2017/050656
§ 371 (c)(1),
(2) Date: Jul. 12, 2018

(87) PCT Pub. No.: WO2017/121845
PCT Pub. Date: Jul. 20, 2017

(65) Prior Publication Data
US 2019/0024319 A1    Jan. 24, 2019

(30) Foreign Application Priority Data

Jan. 14, 2016  (EP) .................................. 16000086

(51) Int. Cl.
| | | |
|---|---|---|
| *D21H 21/10* | (2006.01) | |
| *D21H 17/37* | (2006.01) | |
| *D21H 23/04* | (2006.01) | |
| *C08F 220/12* | (2006.01) | |
| *D21H 17/34* | (2006.01) | |
| *D21H 21/06* | (2006.01) | |

(52) U.S. Cl.
CPC .......... *D21H 21/10* (2013.01); *C08F 220/12* (2013.01); *D21H 17/34* (2013.01); *D21H 17/37* (2013.01); *D21H 21/06* (2013.01); *D21H 23/04* (2013.01)

(58) Field of Classification Search
None
See application file for complete search history.

(56) References Cited

U.S. PATENT DOCUMENTS

| | | | | | |
|---|---|---|---|---|---|
| 4,270,977 | A  * | 6/1981 | Herman | .................. | A61L 15/60 |
| | | | | | 162/168.7 |
| 7,547,376 | B2 * | 6/2009 | Satoh | ..................... | D21H 17/72 |
| | | | | | 162/158 |
| 8,480,853 | B2 * | 7/2013 | Ban | ......................... | C08F 20/10 |
| | | | | | 162/158 |
| 2002/0053413 | A1* | 5/2002 | Zhang | .................... | D21H 21/10 |
| | | | | | 162/168.1 |
| 2006/0266488 | A1 | 11/2006 | Doherty et al. | | |
| 2011/0048660 | A1* | 3/2011 | Esser | ..................... | D21H 17/42 |
| | | | | | 162/164.5 |
| 2011/0174453 | A1* | 7/2011 | Przybyla | .................. | C08F 2/20 |
| | | | | | 162/164.6 |

FOREIGN PATENT DOCUMENTS

| | | | |
|---|---|---|---|
| EP | 2639350 A1 * | 9/2013 | |
| WO | 0140578 A1 | 6/2001 | |

OTHER PUBLICATIONS

Smook, Gary A., Handbook for Pulp and Paper Technologists, 2nd ed, Angus Wilde Publications, 1992, p. 225. (Year: 1992).*
International Search Report for corresponding application No. PCT/EP2017/050656 dated Apr. 6, 2017.

* cited by examiner

*Primary Examiner* — Dennis R Cordray
(74) *Attorney, Agent, or Firm* — McBee Moore & Vanik IP, LLC

(57) ABSTRACT

Method of making a substrate comprising cellulosic fibres such as paper comprising at least steps (a) and (b):
(a) providing an aqueous suspension comprising cellulosic fibres;
(b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, or $C_2H_5$; and $R^2$ is a $C_{1-10}$ alkyl group.

16 Claims, No Drawings

USE OF AN ACRYLATE COPOLYMER AS RETENTION AID IN A METHOD OF MAKING A SUBSTRATE COMPRISING CELLULOSIC FIBRES

CROSS REFERENCE TO RELATED APPLICATIONS

This application is a National Stage entry of International Application No. PCT/EP2017/050656 filed 13 Jan. 2017, which claims priority to European Patent Application No. 16000086.5, filed 14 Jan. 2016 the contents of which are hereby incorporated by reference in its entirety.

BACKGROUND

Field of the Invention

The invention relates to a method of making a substrate comprising cellulosic fibres such as paper, wherein an acrylate copolymer is used as a retention aid. The invention further relates to the use of said retention aid for making a substrate comprising cellulosic fibres and to a substrate comprising cellulosic fibres comprising said copolymer and/or an earth alkali metal salt thereof.

Description of Related Art

During the manufacture of paper and paperboard, a cellulosic suspension is drained on a moving screen (often referred to as a machine wire) to form a sheet, which is then pressed and dried. It is known to apply water-soluble polymers to the cellulosic suspension in order to effect flocculation of the cellulosic solids and enhance drainage on the moving screen. In order to increase output of paper, many papermaking machines operate at high speeds. As a consequence of increased machine speeds, a great deal of emphasis has been placed in the art on drainage and retention aids that provide increased drainage and retention of the papermaking components such as cellulosic fibres and filler during the formation of paper.

US 2008/0128102 relates to a process for making paper or board from a cellulosic suspension, wherein the cellulosic suspension is flocculated using a flocculation system comprising a siliceous material and an organic, cationic or anionic, water-in-water or dispersion micropolymer in a salt solution. Said dispersion may be prepared by polymerizing a water-soluble polymer with a hydrophobic polymer. The water-soluble polymer may be selected e.g. from sodium (meth)acrylate, potassium (meth)acrylate, ammonium (meth)acrylate, and the like, as well as acrylic acid, methacrylic acid, and/or (meth)acrylic amides or ethylenically unsaturated monomers that are capable of producing water-soluble polymers such as vinylpyridine, N-vinylpyrrolidone, styrenesulfonic acid, N-vinylimidazole, diallyldimethylammonium chloride, and the like. Exemplary hydrophobic monomers include ethylenically unsaturated compounds such as styrene, alpha-methyl styrene, p-methylstyrene, p-vinyltoluene, vinylcyclopentane, vinylcyclohexane, vinylcyclooctane, isobutene, 2-methylbutene-1, hexene-1,2-methylhexene-1,2-propylhexene-1, ethyl (meth)acrylate, propyl (meth)acrylate, isopropyl (meth)acrylate, butyl (meth)acrylate, isobutyl (meth)acrylate, pentyl (meth)acrylate, hexyl (meth)acrylate, heptyl (meth)acrylate, octyl (meth)acrylate, cyclopentyl (meth)acrylate, cyclohexyl (meth)acrylate, 3,3,5-trimethylcyclohexyl (meth)acrylate, cyclooctyl (meth)acrylate, phenyl (meth)acrylate, 4-methylphenyl (meth)acrylate, 4-methoxyphenyl (meth)acrylate, and the like, or ethylene, vinylidene chloride, vinylidene fluoride, vinyl chloride or other mainly (aryl)aliphatic compounds having polymerizable double bonds.

U.S. Pat. No. 8,753,479 relates to a process for the production of paper, card and board, including the steps of draining a filler-containing paper stock, having a certain fibrous concentration and containing at least one water-soluble amphoteric copolymer. Said copolymer may be made from e.g. from (a) monomers of esters of acrylic acid, methacrylic acid or maleic acid and the like with aminoalcohols, from (b) monomers such as acrylamides, from (c) $C_3$ to $C_8$ carboxylic acids, and (d) esters of α,β-ethylenically unsaturated mono- and dicarboxylic acids.

WO 98/24973 relates to a process for the production of paper on a paper machine containing a dilution headbox in which a main aqueous flow containing cellulosic fibres and filler is mixed, wherein one or more components providing improved retention are introduced into the main aqueous flow being selected from non-ionic and anionic organic polymers is introduced into the diluting aqueous flow. Anionic organic polymers are e.g. based on acrylamide.

WO 2004/001129 relates to a functional promoter comprising a water-soluble anionic polymer having a molecular weight of at least about 50,000 Daltons and a molecular weight charge index value of at least about 10,000, and a cationic strength component, and to a paper product made with such a system, and method for imparting wet strength to a paper product with the functional promoter. The functional promotor may be a copolymer of acrylic acid and methacrylic acid such as copolymers involving one of several alkyl acrylates and acrylic acid or involving one of several alkyl methacrylates and acrylic acid.

WO 2008/049748 relates to a process for preparing a paper or paper board of improved strength which comprises the steps of providing a cellulosic stock, wherein the cellulosic stock comprises organic polymeric microparticles. More preferably, the organic polymeric microparticles are formed from acrylic monomers, most preferably, from acrylic monomers comprising at least one acrylic anionic monomer and at least one acrylic non-ionic monomer. Examples of acrylic anionic monomers are (meth)acrylic acid, 2-acrylamido-2-methyl-1-propanesulfonic acid and salts thereof. Preferred acrylic anionic monomers are (meth)acrylic acid and salts thereof. More preferred anionic monomers are acrylic acid and salts thereof. Examples of acrylic non-ionic monomers are (meth)acrylamide, N—$C_{1-4}$-alkyl (meth)acryl-amides such as N-methyl (meth)acrylamide), N,N-di($C_{1-4}$-alkyl) (meth)acrylamides such as N,N-dimethyl (meth)acrylamide, $C_{1-4}$-alkyl (meth)acrylates such as methyl (meth)acrylate and acrylonitril. Preferably, the acrylic non-ionic monomer is (meth)acrylamide. More preferably, it is acrylamide.

U.S. Pat. No. 5,543,446 relates to a water-soluble terpolymer for use as a dry strength additive for paper consisting essentially of the following units: (a) (meth)acrylamide, (b) an ethylenically unsaturated, aliphatic carboxylic acid or a salt thereof, and (c) a water-soluble, polyvinyl monomer, wherein (c) comprises less than 0.07 mole % water-soluble, polyvinyl monomer based on total monomers.

EP 0 549 925 relates to a method for imparting wet strength to paper with improved water absorbency, that comprises adding to an aqueous suspension of cellulosic paper stock a neutral or alkaline-curing thermosetting wet-strength resin, a water-soluble polymer containing carboxyl groups or carboxylate ions as their alkali metal or ammonium salts, and a substantially non-thermosetting tertiary-amino polyamide-epichlorohydrin resin.

EP 0 462 365 relates to a papermaking process having improved drainage and retention when ionic, organic microbeads of less than about 1,000 nm in diameter in combination with a high molecular weight organic polymer, and/or polysaccharide are present. E.g. anionic microbeads are those made by hydrolyzing acrylamide polymer microbeads etc. those made by polymerizing such monomers as (methyl) acrylic acid and their salts, 2-acrylamido-2-methylpropane sulfonate, sulfoethyl (meth)acrylate, vinylsulfonic acid, styrene sulfonic acid, maleic or other dibasic acids or their salts or mixtures thereof. Nonionic monomers, suitable for making microbeads as copolymers with the above anionic include (meth)acrylamide; N-alkylacrylamides, such as N-methylacrylamide; N,N-dialkylacrylamides, such as N,N-dimethylacrylamide; methyl acrylate; methyl methacrylate; acrylonitrile; N-vinyl methylacetamide; N-vinyl methyl formamide; vinyl acetate; N-vinyl pyrrolidone, and the like.

U.S. Pat. No. 4,943,349 relates to a process for using papermaking techniques to make a sheet material. This material comprises, in addition to the fibres, an organic binder, a non-binding mineral filler and a flocculant, as well as various conventional additives. An anionic retention agent is added to the fibrous suspension before the flocculant/binder/filler are added. As anionic retention agent it is possible to use, for example, a high molecular weight modified polyacrylamide or a sodium polyacrylate.

WO 01/40578 A1 discloses a papermaking method and a composition which utilize, as a drainage aid, a water soluble hydrophobically associative polymer which is a copolymer prepared from monomers which include a hydrophobic ethylenically unsaturated monomer, and one or more of a nonionic ethylenically unsaturated monomer, a cationic ethylenically unsaturated monomer, and an anionic ethylenically unsaturated monomer.

US 2006/0266488 A1 discloses a method of improving retention and drainage comprising adding a water compatible hydrophobic copolymer to a papermaking slurry, and further discloses a composition comprising a water compatible hydrophobic copolymer.

There is an ongoing need in the industry for providing new retention aids.

OBJECTS OF THE INVENTION

It is an object of the invention to provide a retention aid suitable in a process for making a substrate comprising cellulosic fibres such as paper.

SUMMARY

This object has been achieved with an acrylate copolymer comprising carboxyl or carboxylate groups and ester groups.

More specifically, in a first aspect, the invention relates to a method of making a substrate comprising cellulosic fibres, the method comprising at least steps (a) and (b):
  (a) providing an aqueous suspension comprising cellulosic fibres;
  (b) adding to the suspension provided in step (a) an acrylate copolymer containing carboxyl groups or a salt thereof and ester groups;
wherein the acrylate copolymer is the polymerization product of monomers at least selected from a carboxylic acid ester of general formula I $CH_2=CR^1-CO_2R^2$ and a carboxylic acid of general formula II $CH_2=CR^3-COOH$ or a salt thereof, wherein $R^1$ and $R^3$ are independently selected from H, $CH_3$, or $C_2H_5$;
and $R^2$ is a $C_{1-10}$ alkyl group.

In one embodiment, at least 80% by weight of the copolymer containing carboxyl groups or a salt thereof and ester groups used in step (b) are based on monomers of formula I and formula II, the remainder being based on one or more monomers being different from monomers of formula I and formula II, wherein the total weight of the copolymer is 100% by weight.

In one embodiment, an aqueous suspension is provided in step (a) having a pH greater than 6.0, preferably greater than 7.

In one embodiment, said aqueous suspension provided in step (a) comprises a filler comprising earth alkali ions, preferably calcium ions.

In one embodiment, the water hardness of said aqueous suspension provided in step (a) is adjusted to 90 or greater than 90 expressed in mmol/l earth alkali ions.

In one embodiment, $R^1$=H and $R^3$=$CH_3$.

In one embodiment, $R^2$ is selected from methyl, ethyl, n-propyl, iso-propyl, n-butyl, sec-butyl, iso-butyl, tert-butyl, n-pentyl and isomers thereof, n-hexyl and isomers thereof, n-heptyl and isomers thereof, n-octyl and isomers thereof such as 2-ethylhexyl, n-nonyl and isomers thereof, and n-decyl and isomers thereof, cyclopentyl, cyclohexyl, or cycloheptyl.

In one embodiment, $R^2$ is selected from methyl, ethyl, n-propyl, n-butyl, or 2-ethylhexyl.

In one embodiment, the molar ratio of carboxylic acid ester of general formula I to carboxylic acid of general formula II is in the range of from 2:1 to 1.1:1.

In one embodiment, the average molecular weight $M_w$ of the copolymer is in the range of from 300,000 to 1,000,000 Da such as 350,000 to 450,000 Da.

In one embodiment, said copolymer is added in step (b) in the form of an aqueous suspension.

In one embodiment, the pH of said added aqueous suspension is adjusted to a value of less than 6.

In one embodiment, said copolymer is added in step (b) in an amount of from 0.01 to 10% by weight based on the amount of cellulosic fibres (calculated as dry substances, respectively, wherein the total amount is 100% by weight) such that after step (b) the pH of the resulting mixture is greater than 6.0, preferably greater than 7; or the pH after step (b) is adjusted to a pH of greater than 6, preferably greater than 7.

In one embodiment, the method further comprises steps (c) and (d):
  (c) subjecting the mixture obtained in step (b) to a wire in order to form a sheet of a substrate comprising cellulosic fibres; and
  (d) pressing the sheet obtained in step (c) in a press in order to form a pressed sheet of a substrate comprising cellulosic fibres and/or drying the sheet or the pressed sheet.

In a second aspect, the invention further relates to the use of a copolymer containing carboxyl groups and ester groups as defined in the first aspect for making a substrate comprising cellulosic fibres.

In a third aspect, the invention relates to a substrate comprising cellulosic fibres comprising an acrylate copolymer containing carboxyl groups and ester groups as defined in the first aspect and/or comprising an earth alkali salt of an acrylate copolymer containing carboxyl groups and ester groups as defined in the first aspect, preferably a calcium salt.

Preferably, the substrate comprising cellulosic fibres is a paper.

The invention further encompasses the following items:

1. Method of making a substrate comprising cellulosic fibres, comprising at least steps (a) and (b):
   (a) providing an aqueous suspension comprising cellulosic fibres;
   (b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ is H and $R^3$ is $CH_3$ or $C_2H_5$;
and $R^2$ is a $C_{1-10}$ alkyl group.

2. Method according to item 1, wherein $R^3$ is $CH_3$.

3. Method according to at least one of the preceding items, wherein $R^2$ is selected from methyl, ethyl, n-propyl, iso-propyl, n-butyl, sec-butyl, iso-butyl, tert-butyl, n-pentyl and isomers thereof, n-hexyl and isomers thereof, n-heptyl and isomers thereof, n-octyl and isomers thereof such as 2-ethylhexyl, n-nonyl and isomers thereof, and n-decyl and isomers thereof, cyclopentyl, cyclohexyl, or cycloheptyl.

4. Method according to at least one of the preceding items, wherein $R^2$ is selected from methyl, ethyl, n-propyl, or isopropyl.

5. Method according to at least one of the preceding items, wherein the molar ratio of acrylic ester of general formula I to acrylic acid of general formula II is in the range of from 2:1 to 1.1:1.

6. Method of making a substrate comprising cellulosic fibres, comprising at least steps (a) and (b):
   (a) providing an aqueous suspension comprising cellulosic fibres;
   (b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, or $C_2H_5$;
and $R^2$ is selected from methyl, ethyl, n-propyl, or isopropyl.

7. Method of item 6, wherein $R^1$ is H and $R^3$ is $CH_3$ or $C_2H_5$, preferably $CH_3$.

8. Method according to at least one of the preceding items, wherein the molar ratio of acrylic ester of general formula I to acrylic acid of general formula II is in the range of from 2:1 to 1.1:1.

9. Method of making a substrate comprising cellulosic fibres, comprising at least steps (a) and (b):
   (a) providing an aqueous suspension comprising cellulosic fibres;
   (b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, or $C_2H_5$;
and $R^2$ is a $C_{1-10}$ alkyl group; and
wherein the molar ratio of acrylic ester of general formula I to acrylic acid of general formula II is in the range of from 2:1 to 1.1:1.

10. Method of item 9, wherein $R^1$ is H and $R^3$ is $CH_3$ or $C_2H_5$, preferably $CH_3$.

11. Method according to at least one of items 9 to 10, wherein $R^2$ is selected from methyl, ethyl, n-propyl, iso-propyl, n-butyl, sec-butyl, iso-butyl, tert-butyl, n-pentyl and isomers thereof, n-hexyl and isomers thereof, n-heptyl and isomers thereof, n-octyl and isomers thereof such as 2-ethylhexyl, n-nonyl and isomers thereof, and n-decyl and isomers thereof, cyclopentyl, cyclohexyl, or cycloheptyl.

12. Method according to at least one of items 9 to 11, wherein $R^2$ is selected from methyl, ethyl, n-propyl, or isopropyl.

13. Method of making a substrate comprising cellulosic fibres, comprising at least steps (a) and (b):
   (a) providing an aqueous suspension comprising cellulosic fibres;
   (b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, or $C_2H_5$;
and $R^2$ is a $C_{1-10}$ alkyl group;
under the proviso that the acrylate copolymer is not the polymerization product of acrylic acid butyl ester with acrylic acid in a monomer molar ratio of 50:50.

14. Method according to item 13, wherein $R^1$ is H and $R^3$ is $CH_3$.

15. Method according to at least one of items 13 to 14, wherein $R^2$ is selected from methyl, ethyl, n-propyl, iso-propyl, n-butyl, sec-butyl, iso-butyl, tert-butyl, n-pentyl and isomers thereof, n-hexyl and isomers thereof, n-heptyl and isomers thereof, n-octyl and isomers thereof such as 2-ethylhexyl, n-nonyl and isomers thereof, and n-decyl and isomers thereof, cyclopentyl, cyclohexyl, or cycloheptyl.

16. Method according to at least one of claims 13 to 15, wherein $R^2$ is selected from methyl, ethyl, n-propyl, or isopropyl.

17. Method according to at least one of items 13 to 17, wherein the molar ratio of acrylic ester of general formula I to acrylic acid of general formula II is in the range of from 2:1 to 1.1:1.

18. Method according to at least one of preceding items, wherein at least 50 or 60 or 70 or 80% by weight of the copolymer containing carboxyl groups or a salt thereof and ester groups used in step (b) are based on monomers of formula I and formula II, the remainder being based on one or more monomers being different from monomers of formula I and formula II, wherein the total weight of the copolymer is 100% by weight.

19. Method according to at least one of the preceding items, wherein the average molecular weight $M_w$ of the acrylate copolymer is in the range of from 300,000 Da to 1,000,000 Da, preferably 350,000 to 450,000 Da.

20. Method according to at least one of the preceding items, wherein in step (a) an aqueous suspension is provided having a pH greater than 6, preferably greater than 7.

21. Method according to at least one of the preceding items, wherein said aqueous suspension provided in step (a) comprises a filler comprising earth alkali ions, preferably calcium ions.

22. Method according to at least one of the preceding items, wherein the water hardness of said aqueous suspension provided in step (a) is adjusted to 90 or greater than 90 expressed in mmol/l earth alkali ions.

23. Method according to at least one of the preceding items, wherein said acrylate copolymer added in step (b) is added in the form of an aqueous suspension; or wherein said acrylate copolymer added in step (b) is added in the form of an aqueous suspension, wherein the pH of the suspension is adjusted to less than 6.

24. Method according to at least one of the preceding items, wherein said acrylate copolymer is added in step (b) in an amount of from 0.01 to 10% by weight based on the amount of cellulosic fibres (calculated as dry substances, respectively, wherein the total amount is 100% by weight) such that after step (b) the pH of the resulting mixture is greater than 6.0, preferably greater than 7; or the pH after step (b) is adjusted to a pH greater than 6, preferably greater than 7.

25. Method according to at least one of the preceding items, further comprising steps (c) and (d):
   (c) subjecting the mixture obtained in or after step (b) to a wire in order to form a sheet of a substrate comprising cellulosic fibres; and
   (d) pressing the sheet obtained in step (c) in a press in order to form a pressed sheet of a substrate comprising cellulosic fibres and/or drying the sheet or the pressed sheet.

26. Use of an acrylate copolymer containing carboxyl groups and ester groups as defined in at least one of items 1 to 24 for making a substrate comprising cellulosic fibres.

27. Substrate comprising cellulosic fibres comprising an acrylate copolymer containing carboxyl groups and ester groups as defined in at least one of items 1 to 19; or comprising an earth alkali salt of an acrylate copolymer containing carboxyl groups and ester groups as defined in at least one of items 1 to 19, preferably a calcium salt; or comprising an acrylate copolymer containing carboxyl groups and ester groups as defined in at least one of items 1 to 19 and comprising an earth alkali salt of an acrylate copolymer containing carboxyl groups and ester groups as defined in any one of items 1 to 19, preferably a calcium salt, preferably wherein the substrate is a paper.

DETAILED DESCRIPTION OF A PREFERRED EMBODIMENT

The following terms in quotation marks are used in the meaning of the invention.

In a first aspect, the invention relates to a method of making a substrate comprising cellulosic fibres such as paper, comprising at least steps (a) and (b):
   (a) providing an aqueous suspension comprising cellulosic fibres;
   (b) adding to the suspension provided in step (a) an acrylate copolymer containing carboxyl groups or salts thereof and ester groups;
wherein the acrylate copolymer is the polymerization product of monomers at least selected from a carboxylic acid ester of general formula I $CH_2=CR^1-CO_2R^2$ and a carboxylic acid of general formula II $CH_2=CR^3-COOH$ or a salt thereof, wherein $R^1$ and $R^3$ are independently selected from H, $CH_3$, or $C_2H_5$, and $R^2$ is a $C_{1-10}$ alkyl group.

In another aspect, the invention relates to a method of making a substrate comprising cellulosic fibres such as paper, comprising at least steps (a) and (b):
   (a) providing an aqueous suspension comprising cellulosic fibres;
   (b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ is H and $R^3$ is $CH_3$ or $C_2H_5$, preferably $CH_3$; and $R^2$ is a $C_{1-10}$ alkyl group.

In another aspect, the invention relates to a method of making a substrate comprising cellulosic fibres such as paper, comprising at least steps (a) and (b):
   (a) providing an aqueous suspension comprising cellulosic fibres;
   (b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, or $C_2H_5$;
and $R^2$ is selected from methyl, ethyl, n-propyl, or isopropyl.

In another aspect, the invention relates to a method of making a substrate comprising cellulosic fibres such as paper, comprising at least steps (a) and (b):
   (a) providing an aqueous suspension comprising cellulosic fibres;
   (b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, or $C_2H_5$;
and $R^2$ is a $C_{1-10}$ alkyl group; and
wherein the molar ratio of acrylic ester of general formula I to acrylic acid of general formula II is in the range of from 2:1 to 1.1:1.

In another aspect, the invention relates to a method of making a substrate comprising cellulosic fibres such as paper, comprising at least steps (a) and (b):
   (a) providing an aqueous suspension comprising cellulosic fibres;
   (b) adding to the suspension provided in step (a) an acrylate copolymer containing carboxyl groups or a salt thereof and ester groups;
wherein the acrylate copolymer is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, or $C_2H_5$;
and $R^2$ is a $C_{1-10}$ alkyl group;
under the proviso that the acrylate copolymer is not the polymerization product of an acrylic acid butyl ester with acrylic acid in a monomer molar ratio of 50:50.

The method according to the invention is used for the production of a substrate comprising cellulosic fibres such as a paper.

The term "substrate" does not only encompass paper and the production thereof, but also other web-like products, such as for example board and paperboard and the production thereof. Further examples falling under the term "substrate" are e.g. paper towels or any other tissue comprising cellulosic fibres.

The acrylate copolymer used in step (b) may be termed as a retention aid. The term "retention aid" or "retention agent" means a compound that improves the retention of a chemical in a substrate during a process for making the substrate, e.g. by flocculation of said chemical such that it is adsorbed by the substrate. As a result, less of the chemical goes to waste, and thus less of the chemical is necessary compared to a process not employing a retention aid.

The carboxylic acid ester of formula I is an acrylic acid ester, and the carboxylic acid of formula II is an acrylic acid.

The term "acrylic acid ester" encompasses an ester of acrylic acid $CH_2=CH-CO_2R^2$ as well as any type of an acrylic acid ester falling under formula I.

The term "acrylic acid" encompasses acrylic acid $CH_2=CH-CO_2H$ as well as any type of an acrylic acid falling under formula II.

The term "acrylic acid ester" or "acrylic acid" encompasses a $CH_2=CR^1-$, respectively $CH_2=CR^3-$ moiety, as defined in formula I, respectively formula II. Thus, the term "acrylic" encompasses e.g. the term "methacrylic".

The term "acrylate" used in conjunction with terms such as "acrylic acid ester" and "acrylic acid" encompasses a $CH_2=CR^1-$, respectively $CH_2=CR^3-$ moiety, as defined in formula I, respectively formula II. Thus, the term "acrylate" encompasses e.g. the term "methacrylate".

Accordingly, the term "acrylate copolymer" encompasses a backbone comprising moieties derived from monomers of formula I and formula II.

Furthermore, the copolymer, respectively acrylate copolymer, used in the method of the invention may comprise further moieties which are described hereinunder, and which are different from the moieties derived from monomers of formula I, respectively formula II.

Step (a)

Step (a) of the method according to the invention requires the provision of an aqueous suspension comprising cellulosic fibres.

The term "aqueous suspension comprising cellulosic fibres" is synonymously used with terms such as "paper making stock" or "stock" or "pulp" or "pulp slurry" or the like.

Different types of aqueous suspensions of cellulosic fibres may be provided in step (a).

In one embodiment, virgin and/or recovered fibres may be provided. Any softwood or hardwood fibre typically used in the paper industry can be used, examples being mechanical pulp, bleached and unbleached chemical pulp and also fibrous materials from any annual plants.

Mechanical pulp includes for example groundwood, thermomechanical pulp (TMP), chemothermomechanical pulp (CTMP), pressure groundwood, semichemical pulp, high-yield pulp and refiner mechanical pulp (RMP). Sulfate, sulfite and soda chemical pulps can be used for example. Preference is given to using unbleached chemical pulp, also known as unbleached kraft pulp.

Suitable annual plants for production of fibrous materials include for example rice, wheat, sugar cane and kenaf, elephant grass, bagasse, flax, and straw.

Pulps can also be produced using wastepaper, used alone or in admixture with other fibrous materials. The wastepaper can come from a de-inking process for example. However, it is not necessary to subject the wastepaper to be used to such a process. It is further also possible to proceed from fibrous mixtures formed from a primary stock and recycled coated broke.

In one embodiment, the suspension provided in step (a) should suitably contain at least 25% and preferably at least 50% by weight of such cellulosic fibres, based on dry substance. However, in another embodiment, the suspension provided in step (a) may contain less than 25% of such fibres, based on dry substance.

The method according to the invention can also be used for making filled substrates comprising cellulosic fibres such as filled paper. The suspension provided in step (a) thus may comprise any suitable amount of filler. In some embodiments, the cellulosic suspension comprises up to 50 percent by weight of filler, generally 5 to 50 percent by weight of filler, specifically 10 to 40 percent by weight of filler, based on the dry weight of the cellulosic suspension.

Exemplary fillers include precipitated calcium carbonate, ground calcium carbonate, kaolin, chalk, talc, sodium aluminum silicate, calcium sulphate, titanium dioxide, and the like, and a combination comprising at least one of the foregoing fillers. Thus, according to this embodiment, a process is provided for making filled paper or paperboard, wherein the cellulosic suspension provided in step (a) comprises a filler, and wherein the cellulosic suspension is treated according to step (b). Preferred fillers are based on calcium. Fillers may originate from waste paper and/or may be added to the aqueous suspension comprising cellulosic fibres. In other embodiments, the cellulosic suspension is free of filler.

The aqueous suspension provided in step (a) may contain further additives that are commonly used in the paper making industry. Further additives may be e.g. selected from cationic coagulants, dry strength agents, wet strength agents, further retention aids being different from the acrylate copolymer as claimed, sizing agents, optical brighteners, pigments and dyes as well as dye fixatives.

Cationic coagulants, which are organic polymers, can be added in order to neutralize the charge of the stock, which may be required, when, for example, an anionic retention aid of relatively high molecular weight is added to the stock.

Examples of dry strength agents are water-soluble anionic copolymers of acrylamide of relatively low molecular weight (usually below one million g/mol) and polysaccharides of relatively high molecular weight. Examples of anionic copolymers of acrylamide are copolymers derived from acrylamide and an anionic monomer such as acrylic acid. Examples of polysaccharides are carboxymethyl cellulose, guar gum derivatives and starch.

Wet strength agents are e.g. urea-formaldehyde resins, melamine-formaldehyde resins and resins based on polyamide-epichlorohydrin.

Additionally to the retention aid according to the present invention in the present invention, further retention aids may be added, if necessary at all, in order to improve or optimize the retention of the fines, fillers and fibres on the web. Examples of further retention aids are water soluble polymers, anionic inorganic microparticles, polymeric organic microparticles and combinations thereof. The water-soluble polymers used as further retention aids can be non-ionic, cationic or anionic. Examples of non-ionic polymers are polyethylene oxide and polyacrylamide. Examples of cationic polymers are copolymers derived from acrylamide and a cationic monomer such as an alkyl halide adduct of N,N-dialkylaminoalkyl (meth)acrylates, such as N,N-dimethyl-aminoethylacrylate methyl chloride. Examples of anionic polymers are copolymers derived from acrylamide and an anionic monomer such as acrylic acid or 2-acrylamido-2-methyl-1-propane sulfonic acid. Preferably, the anionic polymers used as retention aids are of relatively high molecular weight (usually above one million g/mol).

Examples of anionic inorganic microparticles are colloidal silica and swelling clays such as bentonite.

Two or more retention aids can be combined to form a retention system.

Examples of retention systems are combinations of the retention aid used in the method of the present invention with further anionic water-soluble polymers and/or anionic inorganic microparticles and combinations with cationic water-soluble polymers, anionic water-soluble polymers and anionic inorganic microparticles. When the retention system also comprises a cationic water-soluble polymer, this cationic polymer is usually added to the stock before adding the anionic water-soluble polymer and the anionic inorganic microparticle.

Further examples of retention systems are combinations with cationic water-soluble polymers and polymeric organic microparticles and combinations with cationic water-soluble polymers, anionic water-soluble polymers and polymeric organic microparticles.

In one embodiment, the further added retention aid is a cationic water-soluble polymer or a retention system comprising a cationic water-soluble polymer. However, although the retention aid defined in step (b) works well in combination with a cationic water-soluble polymer, in one embodiment, the retention aid used in step (b), due to its high efficiency, is employed in the method according to the invention in the absence of a cationic water-soluble or water-dispersable polymer.

Examples of sizing agents are natural sizing agents such as rosin and synthetic sizing agents such as alkenyl succinic anhydride and alkyl ketene dimer.

Examples of optical brighteners are stilbene derivatives. Suitable products are known in the art.

The aqueous suspension comprising cellulosic fibres provided in step (a) can also contain pigments or dyes in order to dye the paper to be produced.

The aqueous suspension comprising cellulosic fibres provided in step (a) may also contain crosslinking agents in order to improve wet strength properties.

The person skilled in the art knows at which point of production of paper said additives are added.

The inventors of the present invention have unexpectedly discovered that the pH of the aqueous suspension provided in step (a) as well as the pH of the suspensions after adding an acrylate copolymer in step (b) may have a significant influence on the benefit of the method according to the invention.

In one embodiment, the pH of the aqueous suspension, respectively the pH after adding the copolymer in step (b), should at least be 6 or greater in order to obtain a benefit of the method according to the invention being as high as possible.

Accordingly, in one embodiment, the pH of said aqueous suspension provided in step (a) is set to a value of greater than 6.

In a further preferred embodiment, said aqueous suspension comprising cellulosic fibres provided in step (a) comprises hydroxyl ions, i.e. the pH of said aqueous suspension provided in step (a) is greater than 7. If necessary, said pH may be respectively adjusted by adding a respective base such as aqueous alkali or earth alkali.

It is believed that in particular a pH value of greater than 7 is beneficial since then at least a part of said carboxyl groups of the acrylate copolymer used in step (b) are transferred into their anionic form when added to the suspension of cellulosic fibres provided in step (a), i.e. into carboxylate groups. It is believed that the hydrophilic portions of the retention aid used in the present invention, i.e. the acrylic acid portion, carry a negative charge and help with aqueous solubility, whereas the hydrophobic sections (the ester sections) prefer instead to align themselves with non-aqueous components in the aqueous suspension comprising cellulosic fibres provided in step (a). This mechanism can be demonstrated by measuring the zeta potential (ZP) which is linked to the surface charge on the solid components in the stock. The ZP values become more negative after the addition of the retention aid used in the present invention, i.e. the acrylate copolymer containing carboxyl groups or salts thereof and ester groups as defined in step (b), confirming adsorption of the polymer and creating additional demand. Thus, but without being bound by theory, this is an evidence that said anionic form has a stronger adhesion to cellulosic fibres than the protonated form.

It is surprising that under said selected pH conditions of a pH preferably greater than 7, the copolymer used in step (a) may be strongly attracted by the cellulosic fibres, which bear under said pH conditions also negative charges. Rather, instead of attraction, repulsion would be expected.

Thus, in one embodiment, if necessary, the pH of the suspension after adding the copolymer in step (b) is adjusted to a pH greater than 6, preferably greater than 7. For adjustment, suitable bases such as aqueous alkali or earth alkali may be used.

Also fillers based on earth alkali compounds, preferably based on calcium compounds, have proved to promote the properties of the retention aid used in the method of the present invention. Without being bound by theory, it is believed that by means of complexing or salt formation of earth alkali ions with said anionic groups of said acrylate copolymer and further suitable groups of the cellulosic fibres, e.g. hydroxyl groups, relatively strong complexes, respectively aggregates may be formed.

This effect may also be present in absence of an earth alkali-containing filler provided the aqueous suspension of fibres provided in step (a) has a relatively high water hardness with regard to earth alkali ions such as calcium ions, e.g. since the water used for making the aqueous suspension has already a relatively high water hardness.

In one embodiment, in step (a) an aqueous suspension of fibres is provided having a water hardness of 90 or greater than 90 expressed in mmol/l earth alkali ions.

In one embodiment, the water hardness is adjusted by using water already having the respective water hardness for making the aqueous suspension.

In another embodiment, the water hardness is adjusted by adding earth alkali ions, preferably calcium ions. E.g., a filler based on calcium may be added to said aqueous suspension.

Step (b)

Step (b) requires adding to the aqueous suspension provided in step (a) a copolymer containing carboxyl groups or a salt thereof and ester groups, i.e. an acrylate copolymer containing carboxyl groups or a salt thereof and ester groups. The term "containing" is synonymously used with the term "comprising".

The term "copolymer containing carboxyl groups or a salt thereof and ester groups" encompasses a copolymer which is the polymerization product of monomers at least selected from an acrylic acid ester and an acrylic acid or a salt thereof as defined in formula I, respectively formula II. The term "acrylate copolymer containing carboxyl groups or a salt thereof and ester groups" encompasses an acrylate copolymer which is the polymerization product of monomers at least selected from an acrylic acid ester and an acrylic acid or a salt thereof as defined in formula I, respectively formula II.

In one embodiment, the term "acrylate copolymer containing carboxyl groups or a salt thereof and ester groups" encompasses an acrylate copolymer which is the polymerization product of monomers selected from an acrylic acid ester and an acrylic acid or a salt thereof as defined in formula I, respectively formula II.

The term also encompasses an acrylate copolymer comprising moieties derived from an acrylic acid ester and an acrylic acid or a salt thereof, or selected from at least one acrylic acid ester and at least one acrylic acid or a salt thereof.

In one embodiment, the term also encompasses an acrylate copolymer consisting of moieties derived from an acrylic acid ester and an acrylic acid or a salt thereof, or selected from at least one acrylic acid ester and at least one acrylic acid or a salt thereof.

According to the invention, said copolymer, i.e. said acrylate copolymer used in step (b), is the polymerization product of monomers at least selected from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, $C_2H_5$, and $R^2$ is a $C_{1-10}$ alkyl group.

In one embodiment, said acrylate copolymer is made from at least two different acrylic esters of the general formula I and/or at least two different acrylic acids of the general formula II, i.e. one acrylic ester of the general formula I or several different acrylic esters of the general formula I may be reacted with one acrylic acid of the general formula II or with several different acrylic acids of formula II.

Suitable salts are e.g. sodium and potassium salts or ammonium salts, or a mixture of two or more thereof.

Accordingly, said acrylate copolymer comprises or consists of moieties derived from an acrylic acid ester of general formula I $CH_2=CR^1-CO_2R^2$ and an acrylic acid of general formula II $CH_2=CR^3-COOH$ or a salt thereof, wherein $R^1$ and $R^3$ are independently selected from H, $CH_3$, $C_2H_5$, and $R^2$ is a $C_{1-10}$ alkyl group.

Said $C_{1-10}$ alkyl group may be a branched or unbranched alkyl group.

In one embodiment, the term "alkyl group" encompasses a cycloalkyl group.

Examples of unbranched and branched alkyl groups are methyl, ethyl, n-propyl, iso-propyl, n-butyl, iso-butyl, tert-butyl, n-pentyl and isomers thereof, n-hexyl and isomers thereof, n-heptyl and isomers thereof, n-octyl and isomers thereof such as 2-ethylhexyl, n-nonyl and isomers thereof, and n-decyl and isomers thereof.

Examples of cycloalkyl groups are cyclopentyl, cyclohexyl, and cycloheptyl.

In one embodiment, $R^1$=H in said acrylate ester of formula I, and $R^3$=$CH_3$ in said acrylic acid of formula II. Accordingly, at least an ester of acrylic acid and methacrylic acid or a salt thereof are used in said polymerization reaction, respectively said acrylate copolymer comprises or consists of moieties derived from an ester of acrylic acid and methacrylic acid or a salt thereof.

In one embodiment, $R^3$ is H and $R^2$ is selected from methyl, ethyl, n-propyl, or isopropyl.

In one embodiment, $R^3$ is H and $R^2$ is selected from methyl, ethyl, n-propyl, n-butyl, 2-ethylhexyl.

In another embodiment, $R^3$ is H and $R^2$ is ethyl.

Specific acrylate copolymers used in step (b) are listed in the following table:

| $R^1$ | $R^2$ | $R^3$ |
|---|---|---|
| H | $CH_3$ | $CH_3$ |
| H | $C_2H_5$ | $CH_3$ |
| H | $n-C_3H_7$ | $CH_3$ |
| H | $n-C_4H_9$ | $CH_3$ |
| H | $n-C_5H_{11}$ | $CH_3$ |
| H | $n-C_6H_{13}$ | $CH_3$ |
| $CH_3$ | $CH_3$ | $CH_3$ |
| $CH_3$ | $C_2H_5$ | $CH_3$ |
| $CH_3$ | $n-C_3H_7$ | $CH_3$ |
| $CH_3$ | $n-C_4H_9$ | $CH_3$ |
| $CH_3$ | $n-C_5H_{11}$ | $CH_3$ |
| $CH_3$ | $n-C_6H_{13}$ | $CH_3$ |
| $CH_3$ | $CH_3$ | H |
| $CH_3$ | $C_2H_5$ | H |
| $CH_3$ | $n-C_3H_7$ | H |
| $CH_3$ | $n-C_4H_9$ | H |
| $CH_3$ | $n-C_5H_{11}$ | H |
| $CH_3$ | $n-C_6H_{13}$ | H |
| H | $CH_3$ | H |
| H | $C_2H_5$ | H |
| H | $n-C_3H_7$ | H |
| H | $n-C_4H_9$ | H |
| H | $n-C_5H_{11}$ | H |
| H | $n-C_6H_{13}$ | H |

The inventors have further discovered that the molar ratio of acrylic ester to acrylic acid or a salt thereof used in the polymerization of monomers I and II may have a significant influence on the benefit of the method according to the invention. In one embodiment, the molar ratio of acrylic ester to acrylic acid or a salt thereof used in the polymerization of monomers I and II is in the range of from 2:1 to 1.1:1 such as 1.6:1 to 1.2:1. Although molar ratios being outside said selected range may be employed, a range of from 2:1 to 1.1:1 such as 1.6:1 to 1.2:1 is beneficial due to well-balanced properties in terms of solubility in the aqueous medium (hydrophilicity) and hydrophobicity.

Accordingly, in one embodiment, the number of carboxyl groups or carboxylate groups in the copolymer is less than the number of ester groups. As already disclosed above, it is believed that when said carboxyl groups of the acrylate copolymer used in step (b) are transferred into their anionic form when having been added to the suspension of cellulosic fibres provided in step (a), i.e. into carboxylate groups, said groups help with aqueous solubility, whereas the hydrophobic sections (the ester sections) prefer instead to align themselves with non-aqueous components in the aqueous suspension comprising cellulosic fibres provided in step (a).

In one embodiment, the average molecular weight $M_w$ of the acrylate copolymer is in the range of from 300,000 to 1,000,000 Da, preferably 350,000 to 450,000 Da, the molecular weight e.g. being measured by the known static light scattering method. Such molecular weight has proved beneficial.

In a further embodiment, besides monomers of general formula I and general formula II, further monomers may be employed when preparing the copolymer used in step (b). Suitable further monomers are e.g. known from the state of the art as e.g. referred to in the Background section. Suitable monomers are e.g. vinylpyridine, N-vinylpyrrolidone, styrenesulfonic acid, N-vinylimidazole, diallyldimethylammonium chloride, styrene, alpha-methyl styrene, p-methylstyrene, p-vinyltoluene, vinylcyclopentane, vinylcyclohexane, vinylcyclooctane, isobutene, 2-methylbutene-1, hexene-1,2-methylhexene-1,2-propylhexene-1, phenyl (meth)acrylate, 4-methylphenyl (meth)acrylate, 4-methoxyphenyl (meth)acrylate, ethylene, vinylidene chloride, vinylidene fluoride, vinyl chloride; monomers of esters of acrylic acid, methacrylic acid or maleic acid and the like with aminoalcohols, monomers such as acrylamides such as (meth)acrylamide, N—$C_{1-4}$-alkyl (meth)acryl-amides such as N-methyl (meth) acrylamide), N,N-di($C_{1-4}$-alkyl) (meth)acrylamides such as N,N-dimethyl (meth)acrylamide, $C_{1-4}$-alkyl (meth)acrylates such as methyl (meth)acrylate and acrylonitrile; 2-acrylamido-2-methylpropane sulfonate, sulfoethyl-(meth)acrylate, vinylsulfonic acid, styrene sulfonic acid, maleic or other dibasic acids or their salts or mixtures thereof; N,N-dialkylacrylamides such as N,N-dimethylacrylamide; acrylonitrile; N-vinyl methylacetamide; N-vinyl methyl formamide; vinyl acetate; N-vinyl pyrrolidone, and the like; hydroxyalkyl acrylate.

In one embodiment, the further monomers are selected from the group consisting of: styrene, methylstyrene and vinyl acetate, 2-hydroxyalkyl (meth)acrylate, acrylamide, methacrylamide, N-hydroxyethyl (meth)acrylamide, or a combination of two or more thereof.

In another embodiment, further monomers having the function of crosslinkers may be added to monomers of formula I and formula II. In one embodiment, such momomers are selected from diacrylates and divinyl compounds. E.g., such momomers may be selected from dimethacrylate monomers, 1,3-butylene glycol dimethacrylate, ethylene glycol dimethacrylate, diethylene glycol dimethacrylate, propylene glycol dimethacrylate, divinylbenzene, trivinylbenzene, glycidyl methacrylate, and mixtures of two or more thereof.

Typically, monomers having crosslinking properties are employed in minor amounts when preparing the copolymer used in step (b), e.g. in an amount of from 0.1 to 1% by weight, based on the total amount of all employed monomers.

It is preferred that at least 80% by weight of the polymer containing carboxyl groups or a salt thereof and ester groups used in step (b) are based on monomers of formula I and formula II, the remainder being based on one or more of monomers being different from the monomers of formula I and formula II, e.g. the above further monomers, wherein the total weight of the copolymer is 100% by weight.

In one embodiment, the retention aid used in the method of the present invention is employed in an amount of from 0.01 to 10% by weight or 0.1 to 5% by weight or 0.01 to 1% by weight based on the amount of cellulosic fibres (calculated as dry substances, respectively).

In one embodiment, said acrylate copolymer is added in step (b) in an amount such that the pH of the resulting mixture is greater than 6.0, preferably greater than 7 for the beneficial reasons outlined above.

The acrylate copolymers containing carboxyl groups or salts thereof and ester groups are obtainable by solution, precipitation, suspension or emulsion polymerization.

In a preferred embodiment, the copolymers may be made by emulsion or suspension polymerization in water. The terms "emulsion" and "suspension" are used synonymously.

Useful aqueous media include water and mixtures of water and at least one water-miscible solvent, for example an alcohol, such as methanol, ethanol, n-propanol, isopropanol, etc.

Polymerization temperatures are preferably in a range from about 30 to 200° C., more preferably from 40 to 110° C. The polymerization may take place under atmospheric pressure or else under reduced or superatmospheric pressure. A suitable pressure range is between 0.1 and 5 bar.

The pH for the copolymerization is preferably adjusted to a value in the range from 3 to 6. The pH can be kept constant during the polymerization by using a customary buffer or by measuring the pH and adding an appropriate amount of an acid or of a base.

To prepare the copolymers, the monomers can be polymerized using initiators capable of forming free radicals. Useful initiators for free-radical polymerization include the customary peroxo and/or azo compounds for this purpose, for example alkali metal or ammonium peroxydisulfates, diacetyl peroxide, dibenzoyl peroxide, succinyl peroxide, di-tert-butyl peroxide, tert-butyl perbenzoate, tert-butyl perpivalate, tert-butyl peroxy-2-ethyl hexanoate, tert-butyl permaleate, cumene hydroperoxide, diisopropyl peroxydicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, azobis(2-amidonopropane) dihydrochloride or 2-2'-azobis(2-methylbutyronitrile). Also suitable are initiator mixtures or redox initiator systems, for example ascorbic acid/iron(II) sulfate/sodium peroxodisulfate, tert-butyl hydroperoxide/sodium disulfite, tert-butyl hydroperoxide/sodium hydroxymethanesulfinate, $H_2O_2$/CuI and also sodium or ammonium peroxodisulfate/sodium disulfite.

The polymerization can be carried out in the presence of at least one chain transfer agent to control the molecular weight. Useful chain transfer agents include the customary compounds known to a person skilled in the art, e.g., sulfur compounds, e.g., mercaptoethanol, 2-ethylhexyl thioglycolate, thioglycolic acid, sodium hypophosphite, formic acid or dodecyl mercaptan and also tribromochloromethane or other compounds that have a controlling effect on the molecular weight of the polymers obtained.

In one embodiment, said acrylate copolymer is not isolated from said aqueous suspension. Accordingly, in one embodiment, said acrylate copolymer is added in step (b) in the form of an aqueous suspension.

In one embodiment, the pH of the suspension is less than 6. In one embodiment, the pH of the suspension is in the range of from 2 to 4. A pH in the acidic range is preferred since the resulting viscosity of the aqueous suspension in said acidic range is lower than in the basic range. This is advantageous in view of technical processing.

In one embodiment, the solids content of the suspension is in the range of from 20 to 40% based on the total weight of the suspension.

Preferably, the minimum film forming temperature of such suspension measured according to DIN 53 787 is in the range of from 20 to 35° C.

Preferably, the glass transition temperature of the copolymers used in step (b) measured according to DIN EN ISO 11357-2:2014-07 is in the range of from 80 to 120° C.

Further Steps

In one embodiment, the method further comprises
(c) subjecting the mixture obtained in or after step (b) to a wire in order to form a sheet of a substrate comprising cellulosic fibres; and (d) pressing the sheet in a press in order to form a pressed sheet of a substrate comprising cellulosic fibres and/or drying the sheet or the pressed sheet.

The acrylate copolymer used in step (b) has excellent retention properties. It allows e.g. to reduce dye usage when making dyed paper towels, to reduce the level of wet strength resins whilst maintaining sheet tensile strength, to reduce refining energies whilst maintaining sheet strength, and to reduce chemical spend, i.e. to improve machine efficiency. These advantages allow for a cost-efficient method of making a substrate comprising cellulosic fibres such as paper.

According to a second aspect, the invention relates to the use of an acrylate copolymer containing carboxyl groups and ester groups as defined in the first aspect for making a substrate comprising cellulosic fibres such as paper.

According to a third aspect, the invention relates to a substrate comprising cellulosic fibres such as paper, which comprises an acrylate copolymer containing carboxyl groups and ester groups as defined in the first aspect.

Furthermore, the invention relates to a substrate comprising cellulosic fibres such as paper, and further comprising an earth alkali salt of an acrylate copolymer containing carboxyl groups and ester groups as defined in the first aspect, preferably a calcium salt.

The invention is further described in the following illustrative examples in which all parts and percentages are by weight unless otherwise indicated.

EXAMPLES

General Method for Preparing a Retention Aid Used in the Method According to the Invention A reactor equipped with a stirrer was charged with a mixture of water, a commercially available emulsifier and a commercially available surfactant suitable for emulsion polymerization, ammonium persulfate and hydrogen peroxide. The mixture was heated to 80° C. Then, an acrylic acid ester of general formula I $CH_2=CR^1-CO_2R^2$ and an acrylic acid of general formula II $CH_2=CR^3-COOH$ were slowly added. The mixture was stirred for 5 to 10 h. After the polymerization was terminated, sodium metabisulfite and ascorbic acid were added. The resulting suspension cooled down to ambient temperature was milky white.

The retention aids in the following table were prepared according to the general method:

| Example | $R_1, R_2$ | $R_3$ | Molar ratio acrylate/acrylic acid | Physical properties |
|---|---|---|---|---|
| 1 | H, $C_2H_5$ | $CH_3$ | 1.4 | solids content: 30%; pH: 3.5; Mw: 400,000 Da; minimum film forming temperature: 27° C. (DIN 53 787) |
| 2 | H, n-$C_4H_9$ | $CH_3$ | 1.2 | solids content: 30%; pH: 4.5 |
| 3 | H, $C_2H_5$ | H | 1.3 | solids content: 30%; pH: 4.0 |
| 4 | $CH_3$, $C_2H_5$ | $CH_3$ | 1.3 | solids content: 30%; pH: 4.0 |
| 5 | H, $C_2H_5$ | $CH_3$ | 1.2 | solids content: 30%; |
| 6 | H, $C_2H_5$ | H | 1.2 | solids content: 30%; |
| 7 | H, n-$C_4H_9$ | H | 1.3 | solids content: 25%; pH: 3 |

Example 5: Machine Trial for Making Blue Paper Towel

The process of this invention was evaluated on a paper machine producing pale blue towel paper at a production rate of 2.8 t/hr. During the trial, 250 g of a cellulose enzyme were added per ton of cellulosic fibre suspension, 0.5 to 2.0 kg/t of the suspension from Example 1, 1.6 kg/t of a compound for stickies passivation (Cartaspers® SCS), 23 kg/t of a compound for improving wet strength and 5.3 kg/t of a blue dye (Cartasol® Blue K-CPN).

The resulting blue paper towel showed good wet and dry strength. The ash content in the final sheet was over 4%. Almost all of the retention aid was adsorbed on the solid components since no residual retention aid could be found in the backwater. The retention value increased from 62% to over 70% compared to a process omitting the use of the retention aid prepared in Example 1.

Example 6: Retention Values of Acrylates of Examples 2, 5, 6, and 7

Pulp with a solids content of 4.73% was diluted with water to give a stock having a solids content of 2%. 500 g of stock were stirred and 0.5 kg of Example 2 or Example 5 or Example 6 were added. 100 g of the treated stock were mixed with 400 g water to result in a solids content of 0.4%. 500 g of stock were added to a drainage jar (narrow outlet valve) at 900 rpm. Approximately 200 g of filtrate were collected. The filtrate was passed through a pre-weighed Whatman GF/filter pad, which was subsequently dried in an oven at 105° C. Subsequently, the pad was removed from the oven and cooled in a desiccator. Subsequently, the pad was re-weighed. The lower the filtrate solids, the higher the retention. The results are summarized in the following table (blank is for reference and does not contain any retention aid; already small improvements over blank are regarded as inventive):

| Sample | Weight of GF/C filter [g] | Filtrate weight [g] | GF/C filter + dry filtrate [g] | Filtrate solids/100 g [g] | Retention value [%] |
|---|---|---|---|---|---|
| Blank (reference) | 0.6381 | 200.2 | 0.7833 | 0.0725 | 81.87 |
| 0.5 kg/t Ex. 5 | 0.6473 | 201.0 | 0.7834 | 0.0677 | 83.07 |
| 0.5 kg/t Ex. 2 | 0.6398 | 200.8 | 0.7805 | 0.0701 | 82.48 |
| 0.5 kg/t Ex. 6 | 0.6414 | 201.5 | 0.7869 | 0.0722 | 81.95 |
| 0.5 kg/t Ex. 7 | 0.6414 | 201.5 | 0.7870 | 0.0723 | 81.94 |

The invention claimed is:

1. Method of making a substrate comprising cellulosic fibres, comprising at least (a) and (b):
   (a) providing an aqueous suspension comprising cellulosic fibres;
   (b) adding to the suspension provided in (a) an acrylate copolymer containing carboxyl groups or a salt thereof and ester groups;
   wherein the acrylate copolymer is the polymerization product of monomers at least selected from an acrylic acid ester of formula I $CH_2=CR^1-CO_2R^2$ and an acrylic acid of formula II $CH_2=CR^3-COOH$ or a salt thereof, wherein $R^1$ is H and $R^3$ is $CH_3$ or $C_2H_5$; and $R^2$ is a $C_{1-10}$ alkyl group,
   wherein the acrylate copolymer is water soluble, wherein the average molecular weight Mw of the acrylate copolymer is in the range of from 350,000 to 450,000 Da, and wherein the water hardness of said aqueous suspension provided in (a) is adjusted to 90 or greater than 90 expressed in mmol/l earth alkali ions.

2. Method according to claim 1, wherein $R^3$ is $CH_3$.

3. Method according to claim 1, wherein $R^2$ is selected from methyl, ethyl, n-propyl, iso-propyl, n-butyl, sec-butyl, iso-butyl, tert-butyl, n-pentyl and isomers thereof, n-hexyl and isomers thereof, n-heptyl and isomers thereof, n-octyl and isomers thereof, n-nonyl and isomers thereof, n-decyl and isomers thereof, cyclopentyl, cyclohexyl, or cycloheptyl.

4. Method according to claim 3, wherein n-octyl and isomers thereof comprises 2-ethylhexyl.

5. Method according to claim 1, wherein $R^2$ is selected from methyl, ethyl, n-propyl, or isopropyl.

6. Method according to claim 1, wherein the molar ratio of acrylic ester of formula I to acrylic acid of formula II is in a range of from 2:1 to 1.1:1.

7. Method according to claim 1, wherein the acrylate copolymer is not the polymerization product of acrylic acid butyl ester with acrylic acid in a monomer molar ratio of 50:50.

8. Method according to claim 1, wherein at least 50 or 60 or 70 or 80% by weight of the copolymer containing carboxyl groups or a salt thereof and ester groups used in (b) are based on monomers of formula I and formula II, the remainder being based on one or more monomers being different from monomers of formula I and formula II, wherein the total weight of the copolymer is 100% by weight.

9. Method according to claim 1, wherein in (a) the aqueous suspension provided has a pH greater than 6.

10. Method according to claim 1, wherein said aqueous suspension provided in (a) comprises a filler comprising earth alkali ions.

11. Method according to claim 1, wherein said acrylate copolymer is added in (b) in an amount of from 0.01 to 10% by weight based on the amount of cellulosic fibres (calculated as dry substances, respectively, wherein the total amount of acrylate copolymer and cellulosic fibres is 100% by weight) such that after (b) the pH of the resulting mixture is greater than 6.0; or the pH after (b) is adjusted to a pH greater than 6.

12. Method according to claim 1, further comprising (c) and (d):

(c) subjecting the mixture obtained in or after (b) to a wire in order to form a sheet of a substrate comprising cellulosic fibres; and (d) pressing the sheet obtained in (c) in a press in order to form a pressed sheet of a substrate comprising cellulosic fibres and/or drying the sheet or the pressed sheet.

13. Method according to claim 1, wherein in (a) the aqueous suspension provided has a pH greater than 7.

14. Method according to claim 1, wherein said aqueous suspension provided in (a) comprises a filler comprising calcium ions.

15. Method according to claim 1, wherein said acrylate copolymer is added in (b) in an amount of from 0.01 to 10% by weight based on the amount of cellulosic fibres (calculated as dry substances, respectively, wherein the total amount of acrylate copolymer and cellulosic fibres is 100% by weight) such that after (b) the pH of the resulting mixture is greater than 7.0; or the pH after (b) is adjusted to a pH greater than 7.0.

16. Method according to claim 1, wherein the molar ratio of acrylic ester of formula I to acrylic acid of formula II is in a range of from 1.6:1 to 1.2:1.

* * * * *